Feb. 18, 1969  D. B. WHEELOCK ET AL  3,428,249
CENTRIFUGE
Filed May 9, 1967
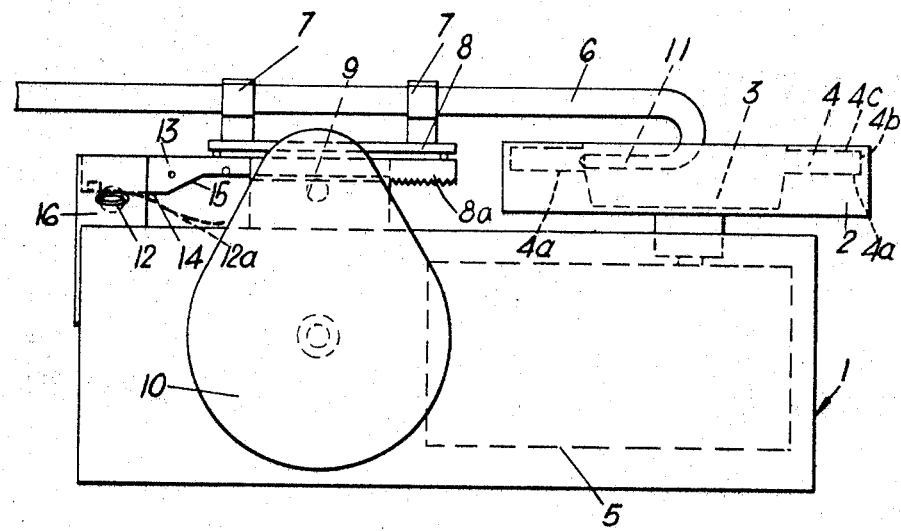
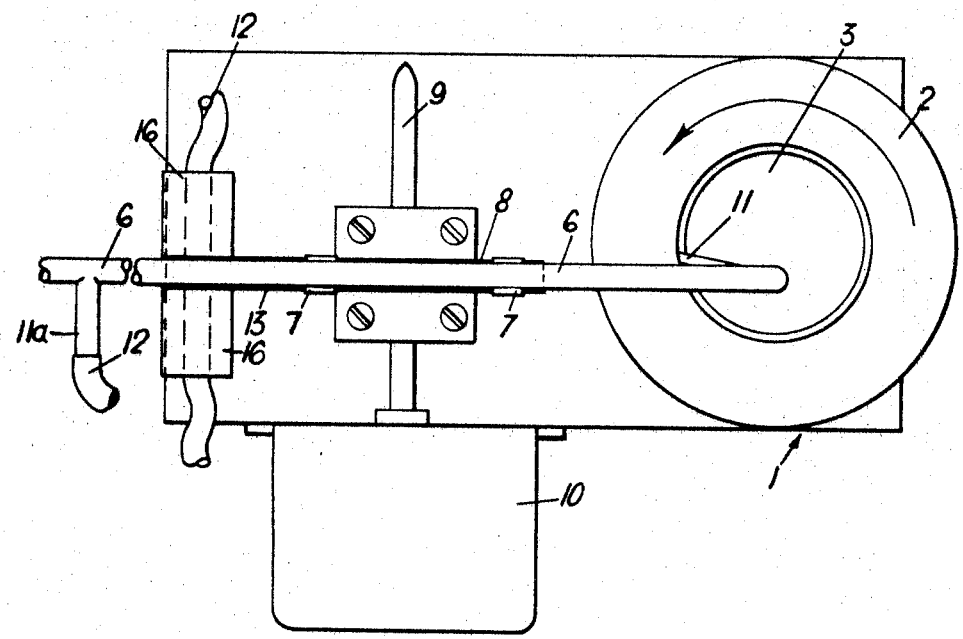
Inventors
DAVID B. WHEELOCK
ROBERT BUCKLEY  By *Imirie & Smiley*
Attorneys

United States Patent Office 3,428,249
Patented Feb. 18, 1969

3,428,249
CENTRIFUGE
David Bent Wheelock, Newbury, and Robert Buckley, Abingdon, England, assignors to Quickfit & Quartz Limited, Stone, Staffordshire, England, a corporation of Great Britain
Filed May 9, 1967, Ser. No. 637,198
Claims priority, application Great Britain, May 17, 1966, 21,939/66
U.S. Cl. 233—22        7 Claims
Int. Cl. B04b 11/08, 1/10, 3/00

ABSTRACT OF THE DISCLOSURE

Apparatus for separating the components of a mixture of substances in a fluid state by centrifugal force comprising a circular basin for receiving a sample mixture to be tested, means for rapidly rotating the basin, said basin including a central well and a surrounding chamber opening into and merging with the well, said chamber comprising a floor extending outwardly from the rim of the basin, a circular end wall along the outer periphery of the floor defining the outer limit of the chamber, and a roof extending inwardly from the defining wall over the floor, a tubular scoop, having an end opening facing against the direction of rotation of the mixture, mounted to laterally traverse the chamber in a direction outwardly from said well, means for regulating the rate of said outward movement of the scoop to permit decanting of a selected phase into a respective receiver and a rigid duct leading away from the scoop for decanting a selected phase gathered by the scoop, and a suction system connectable to the scoop for use after a separation operation.

BACKGROUND OF THE INVENTION

Field of the invention

The invention relates to a centrifuge used in separating a mixture of substances in a fluid state, e.g., a true liquid phase and a substance in suspension in a liquid, which include a spinning basin in which the mixture to be treated is poured and then separated into strata by centrifugal force for decanting as the basin rotates.

Summary

Apparatus of the kind referred to in paragraph 1 comprising a circular basin for receiving a sample mixture to be tested, means for rapidly rotating the basin, said basin including a central well and a surrounding chamber opening into and merging with the well, said chamber comprising a floor extending outwardly from the rim of the basin, a circular end wall along the outer periphery of the floor defining the outer limit of the chamber, and a roof extending inwardly from the defining wall over the floor, a tubular scoop, having an end opening facing against the direction of rotation of the mixture, mounted to laterally traverse the chamber in a direction outwardly from said well, means for regulating the rate of said outward movement of the scoop to permit decanting of a selected phase into a respective receiver and a rigid duct leading away from the scoop for decanting a selected phase gathered by the scoop.

By the use of a centrifuge in accordance with the invention a sample and reagent can be mixed, separated into two or more phases by centrifugal force and the separate phases removed from the apparatus to separate containers.

Preferably an apparatus according to the present invention comprises a resilient suction line, means connecting said line to said rigid duct emanating from the scoop, a regulator associated with said suction line, a movable chassis for said duct and scoop, an actuator for said regulator connected to said chassis to move the chassis and cause the scoop to move laterally across the chamber towards the end wall thereof and simultaneously open the suction system.

By providing the suction system with the scoop, the rigid tube and tubing connecting the tube with a receiver, the apparatus can be readily cleaned after each operation.

In apparatus according to the present invention the rigid duct may be axially adjustable through holding means on the said chassis to set the area in the chamber to be laterally traversed by the scoop and the time of activation of the suction systems.

The apparatus constructed according to the present invention may comprise a chassis provided with a toothed rack element operatively associated by a driven pinion in turn actuated from a reversible motor, said toothed rack element carrying a cam surface in alignment with the regulator to bear on the resilient suction line and normally obturate the connection between said suction system and said duct and then progressively open the system as the pressure on the regulator is relieved whilst the scoop moves laterally across the chamber.

Apparatus according to the present invention wherein the toothed rack element is guided between blocks through which blocks the suction system passes and the rack element bears on the system when the scoop is over the basin and the cam surface progressively relieves the pressure on the suction system to open the suction flow through the duct to the scoop as the rack element is actuated to move the scoop radially of the chamber.

Brief description of the drawings

In order that the invention may be more clearly understood, a preferred embodiment thereof will now be described by way of example with reference to the accompanying drawings, in which:

FIG. 1 is a side elevation of a centrifuge, and
FIG. 2 is a plan view of the centrifuge of FIG. 1.
In the drawings like reference numerals desiginate the same parts.

Description of the preferred embodiment

Referring to the drawings there is shown a casing 1 on which is mounted an open circular basin 2 for separating, by centrifugal forces developed in the basin, a fluid mixture containing at least one liquid phase, for example a mixture of a solid, in particulate form, and a liquid, or a mixture of two or more liquids. The basin is particularly adapated for the separation of a liquid/solid mixture in which the solid is in particulate form.

The feature of the basin being an open basin enables the centrifuge to be used for testing samples.

The circular basin 2 includes a central well 3 of frustoconical shape and an integral surrounding chamber 4, which chamber 4 receives the mixture centrifugally forced thereinto from the well by spinning the basin about its vertical axis. The chamber 4 comprises a floor 4a extending outwardly from the rim of the basin, a circular end wall 4b, along the outer periphery of the floor, defining the outer limit of the chamber 4, and a roof 4c extending inwardly from the defining wall 4b over the floor 4a. The basin 2 is driven by an electric motor 5, fitted with an electromagnet braking device (not shown), to effect centrifugal separation of the mixture into strata.

A rigid duct 6 is mounted externally of the basin 2 in spring clips 7 carried on a chassis 8, the chassis being provided with a toothed rack 8a associated with a driven pinion 9 to effect reciprocation of the duct 6. A reversible synchronous motor 10 is used to rotate the pinion although the duct may be reciprocated manually through the intermediary of the pinion, a shaft to which the pinion is fixed and a handle secured to the shaft.

The duct 6 is extended into a terminal scoop 11 by returning the end under the duct 6 and then slightly offsetting it so that when the duct 6 is moved to the left as viewed in FIG. 2 the open end of the scoop is set to move in a substantially radial path with respect to the chamber 4 in a plane near to the floor level of the chamber.

By suitably actuating the rack 8a the scoop 11 may traverse one or each stratum radially outwards in succession from a datum position over the well 3, and it will be appreciated that the scoop 11 will move laterally to itself in a direction parallel to the longitudinal axis of the duct 6. The duct is firmly mounted in the spring clips 7, but so that it is capable of axial adjustment relative to the rack 8a, and thereby the area of traverse of the scoop 11 through the strata may be varied.

The duct 6 is connected by tubing not shown to any suitable receiver for receiving liquid decanted from the chamber 4 and to assist in decanting one or each liquid stratum and/or a particulate solid stratum the duct 6 is connected by means of a T-piece 11a to a vacuum line 12.

By adjusting the duct 6 relative to the rack 8a through the guiding spring clips 7, the vacuum line 12 is opened at a predetermined point of traverse of the duct by a regulator which regulator consists of an extension 13 of the rack 8a.

The regulator 13 is formed with a cam surface 14, 15, of which surface 14 is arranged to bear on and close the vacuum line 12 until the predetermined decanting point is reached, i.e., when the ramp part 15 of the cam surface permits opening of the vacuum line 12. The extension 13 is guided between guide blocks 16 through which guide blocks the vacuum line 12 extends, the vacuum line being resilient at least between the blocks 16, and a leaf spring indicated at 12a in FIG. 1 may be employed to protect the vacuum line 12 where the regulator bears on the line.

In use, a mixture of at least one liquid and a solid in particulate form to be separated is poured into the well 3 under pressure to assist in mixing. The electric motor 5 is then started up to spin the basin 2 and the mixture is then forced up the tapered wall of the well 3 into the rotating chamber 4 by centrifugal force. In the chamber the phases separate to form discrete strata, the solid phase forming the outermost stratum.

The scoop 11 of the duct 6 is then caused to traverse the liquid phases radially outwards at a rate such that it is kept in contact with the surface of the liquid which is forced into the scoop by the centrifugal liquid flow established by the rotation of the basin.

The phase gathered by the scoop is decanted from the chamber 4 through the duct 6 and is collected in a respective receiver. When the scoop 11 reaches the interface between the liquid stratum and the particulate solid stratum, the vacuum line 12 is opened so that a suction force is applied to the duct 6 which force assists in decanting the solid stratum, which stratum is normally in the form of a fairly thick slurry. This particulate solid stratum is trapped in a suitable trap (not shown) or led away to waste. The movement of the duct 6 is terminated when the scoop 11 approaches the outer wall 4b of the chamber.

A cleaning fluid can be forced into the basin 2 at this time and decanted by assistance of the vacuum to remove the last traces of the solid phase. The duct 6 and scoop 11 are then returned to the datum position and the vacuum line closed by rotating the pinion 9 in the opposite direction and the motor 5 is then stopped.

By the use of the centrifuge herein described each stratum can be directed to separate collection vessels and the centrifuge can be cleaned and drained whilst running. If a mixing stage is not required the centrifuge can be rotated continuously and further systems containing at least one liquid phase may be added and separated therein.

What is claimed is:

1. Apparatus for separating the components of a mixture of substances in a fluid state by centrifugal force comprising a circular basin (2) for receiving a sample mixture to be tested, means (5) for rapidly rotating the basin, said basin including a central well (3) and a surrounding chamber (4) opening into and merging with the well, said chamber comprising a floor (4a) extending outwardly from the rim of the basin, a circular end wall (4b) along the outer periphery of the floor defining the outer limit of the chamber, and a roof (4c) extending inwardly from the defining wall over the floor, a tubular scoop (11), having an end opening facing against the direction of rotation of the mixture mounted to laterally traverse the chamber in a direction outwardly from said well, means (9) for regulating the rate of said outward movement of the scoop to permit decanting of a selected phase into a respective receiver and a rigid duct (6) leading away from the scoop for decanting a selected phase gathered by the scoop.

2. Apparatus according to claim 1, comprising a resilient suction line (12), means (11a) connecting said line to said rigid duct (6) emanating from the scoop, a regulator (13) associated with said suction line, a movable chassis (8) for said duct (6) and scoop (11), an actuator (8a, 9) for said regulator (13) connected to said chassis to move the chassis and cause the scoop to move laterally across the chamber (4) towards the end wall (4b) thereof and simultaneously open the suction system.

3. Apparatus according to claim 2, wherein the rigid duct (6) is axially adjustable through holding means (7) on said chassis (8) to set the area in the chamber to be laterally traversed by the scoop and the time of activation of the suction systems.

4. Apparatus according to claim 2, wherein the chassis (8) is provided with a toothed rack element (8a) operatively associated by a driven pinion (9) in turn actuated from a reversible motor (10), said rack element (8a) carrying a cam surface (14, 15) in alignment with the regulator (13) to bear on the resilient suction line (12) and normally obturate the connection between said suction system and said duct (6) and progressively open the system as the pressure on the regulator is relieved whilst the scoop (11) moves laterally across the chamber.

5. Apparatus according to claim 4, wherein the toothed rack element (8a) is guided between blocks (16, 16), through which blocks the suction system (12) passes and the rack element (8a), bears on the system when the scoop (11) is over the basin and the cam surface (14, 15) progressively relieves the pressure on the suction system to open the suction flow through the duct (6) to the scoop (11) as the rack element (8a) is actuated to move the scoop radially of the chamber.

6. Apparatus according to claim 2, wherein the chassis is provided with a toothed rack element operatively associated by a driven pinion in turn actuated from a reversible motor, said rack element carrying a cam surface in alignment with the regulator to bear on the resilient suction line and normally obturate the connection between said suction system and said duct and progressively open the system as the pressure on the regulator is relieved while the scoop moves laterally across the chamber, the rigid duct being axially adjustable through holding means on said chassis to set the area in the chamber to be laterally traversed by the scoop and the time of activation of the suction systems.

7. Apparatus according to claim 6, wherein the toothed rack element is guided between blocks, through which blocks the suction system passes and the rack element bears on the system when the scoop is over the basin and the cam surface progressively relieves the pressure on the suction system to open the suction flow through the duct to the scoop as the rack element is actuated to move the scoop radially of the chamber.

References Cited

UNITED STATES PATENTS

| 362,449 | 5/1887 | Koelkebeck | 233—22 |
| 962,117 | 6/1910 | Bradley | 233—22 |
| 1,002,471 | 9/1911 | Thelitz | 233—22 |
| 2,692,725 | 10/1954 | Hensgen | 233—22 |

ROBERT W. JENKINS, *Primary Examiner.*